(12) United States Patent
Vissa

(10) Patent No.: US 9,479,987 B2
(45) Date of Patent: Oct. 25, 2016

(54) WIRELESS COMMUNICATION DEVICE WITH INTERNAL LOCAL ACCESS POINT

(71) Applicant: MOTOROLA MOBILITY LLC, Libertyville, IL (US)

(72) Inventor: Sudhir C. Vissa, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 280 days.

(21) Appl. No.: 14/088,172

(22) Filed: Nov. 22, 2013

(65) Prior Publication Data

US 2015/0063312 A1  Mar. 5, 2015

Related U.S. Application Data

(60) Provisional application No. 61/870,961, filed on Aug. 28, 2013.

(51) Int. Cl.
H04W 36/30 (2009.01)
H04W 36/26 (2009.01)

(52) U.S. Cl.
CPC ................... H04W 36/26 (2013.01)

(58) Field of Classification Search
CPC ..................................................... H04W 36/30
See application file for complete search history.

(56) References Cited

U.S. PATENT DOCUMENTS

| | | | |
|---|---|---|---|
| 8,446,830 B2 | 5/2013 | Wu et al. | |
| 2005/0047373 A1* | 3/2005 | Kojima | H04B 7/2628 370/331 |
| 2006/0084439 A1 | 4/2006 | Joshi et al. | |
| 2006/0114883 A1* | 6/2006 | Mehta | H04W 80/04 370/352 |
| 2007/0064684 A1 | 3/2007 | Kottilingal | |
| 2008/0285492 A1 | 11/2008 | Vesterinen | |
| 2009/0116389 A1 | 5/2009 | Ji et al. | |
| 2012/0106475 A1 | 5/2012 | Jung | |
| 2013/0343344 A1* | 12/2013 | Hassan | H04W 36/30 370/332 |

(Continued)

FOREIGN PATENT DOCUMENTS

WO  2008024629 A2  2/2008

OTHER PUBLICATIONS

Jon Brodkin: "Passport WiFi Tech promises cellphone-like handoff between hotspots", Ministry of Innovation/Business of Technology, http://arstechnica.com/business/2012/05/passpoint-wifi-tech-promises-cellphone-like-handoff-between-hotspots/ , May 8, 2012, all pages.

(Continued)

Primary Examiner — Charles C Jiang
Assistant Examiner — Thad Defauw
(74) Attorney, Agent, or Firm — Lerner, David & Littenberg, Krumholz & Mentlik, LLP

(57) ABSTRACT

A method and apparatus for automatically controlling an internal local access point of a host wireless mobile device, comprising automatically disconnecting a first wireless internet service between the host wireless mobile device and an approved first local access point when a service quality of the first wireless internet service is unacceptable and activating the internal local access point, thereby providing a capability to establish second wireless internet service with one or more client devices. Further, the second wireless internet service, when established with one or more client devices, is disconnected after a second approved local access point is determined to be within range or the first approved local access point is again within range.

15 Claims, 5 Drawing Sheets

(56) References Cited

U.S. PATENT DOCUMENTS

2014/0195654 A1* 7/2014 Kiukkonen ............. H04W 8/00
709/220
2014/0307550 A1* 10/2014 Forssell ................ H04W 36/22
370/235

OTHER PUBLICATIONS

Wikipedia, the free encyclopedia, "Media-independent handover", downloaded from the internet: Nov. 20, 2013, all pages.
International Search Report and Written Opinion for Application No. PCT/US2014/053109 dated Dec. 4, 2014.

* cited by examiner

400

405 — DETERMINE A RADIO CHANNEL OF THE 1ST WIRELESS INTERNET SERVICE AND ACTIVATE THE INTERNAL LAP FUNCTION TO PROVIDE A SECOND WIRELESS INTERNET SERVICE USING A LAP IDENTITY FOR THE FIRST WIRELESS INTERNET SERVICE WITH A RADIO CHANNEL THAT IS DIFFERENT THAN THE RADIO CHANNEL OF THE FIRST WIRELESS INTERNET SERVICE

505 — PROVIDE THE 2ND WIRELESS INTERNET SERVICE TO ONE OR MORE CLIENT WMDS

510 — DETERMINE AN IDENTITY OF A 2ND LAP THAT IS AVAILABLE TO THE HOST WMD

515 — IS THE 2ND LAP APPROVED FOR AUTOMATIC CONTROL OF THE INTERNAL LAP FUNCTION?

NO → (back to 510)
YES ↓

520 — END THE 2ND WIRELESS INTERNET SERVICE WITH ONE OR MORE OF THE CLIENT WMDS

*FIG. 5*

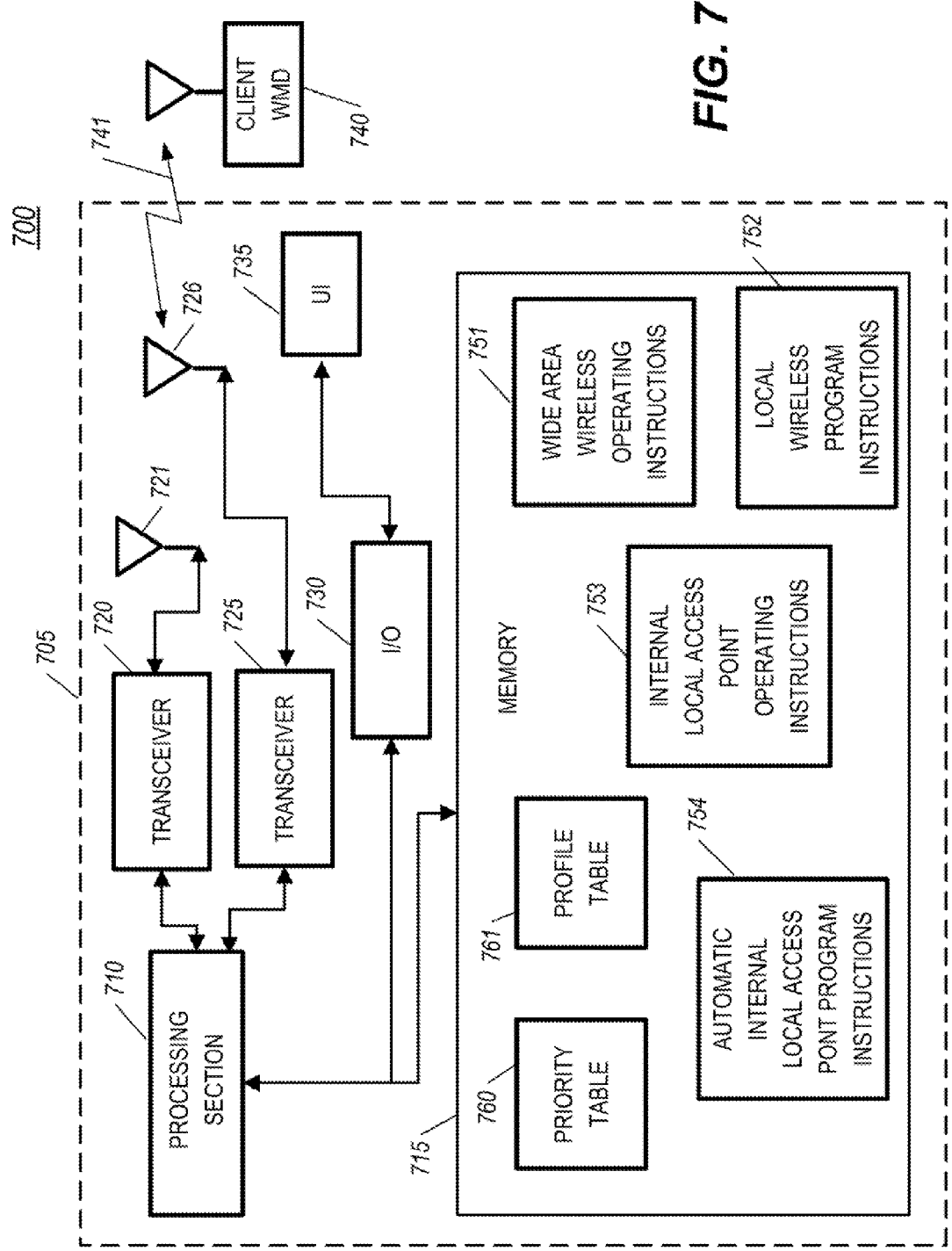

(12) United States Patent
US 9,479,987 B2

WIRELESS COMMUNICATION DEVICE WITH INTERNAL LOCAL ACCESS POINT

FIELD OF THE INVENTION

The present invention relates generally to local area internet services, and more specifically to local area internet services provided by a wireless communication device.

BACKGROUND

Wireless communication devices, such as mobile cellular radios, exist that can provide not only wide area internet service to a user over a wide area wireless network, but can also provide local area wireless internet service to another wireless device using an internal local access point function (known as Hotspot in some systems), in which the wireless internet service is provided over a wireless local area network connection, such as Wi-Fi™ wireless local area connections that are certified by the WiFi Alliance™ organization of Austin, Tex.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments that include the claimed invention, and explain various principles and advantages of those embodiments.

FIGS. 2-5 show some steps of a method used in the host wireless mobile device to automatically enable an internal wireless internet access point, in accordance with certain embodiments.

FIG. 7 shows an electrical block diagram of the host wireless mobile device.

Figure 1:
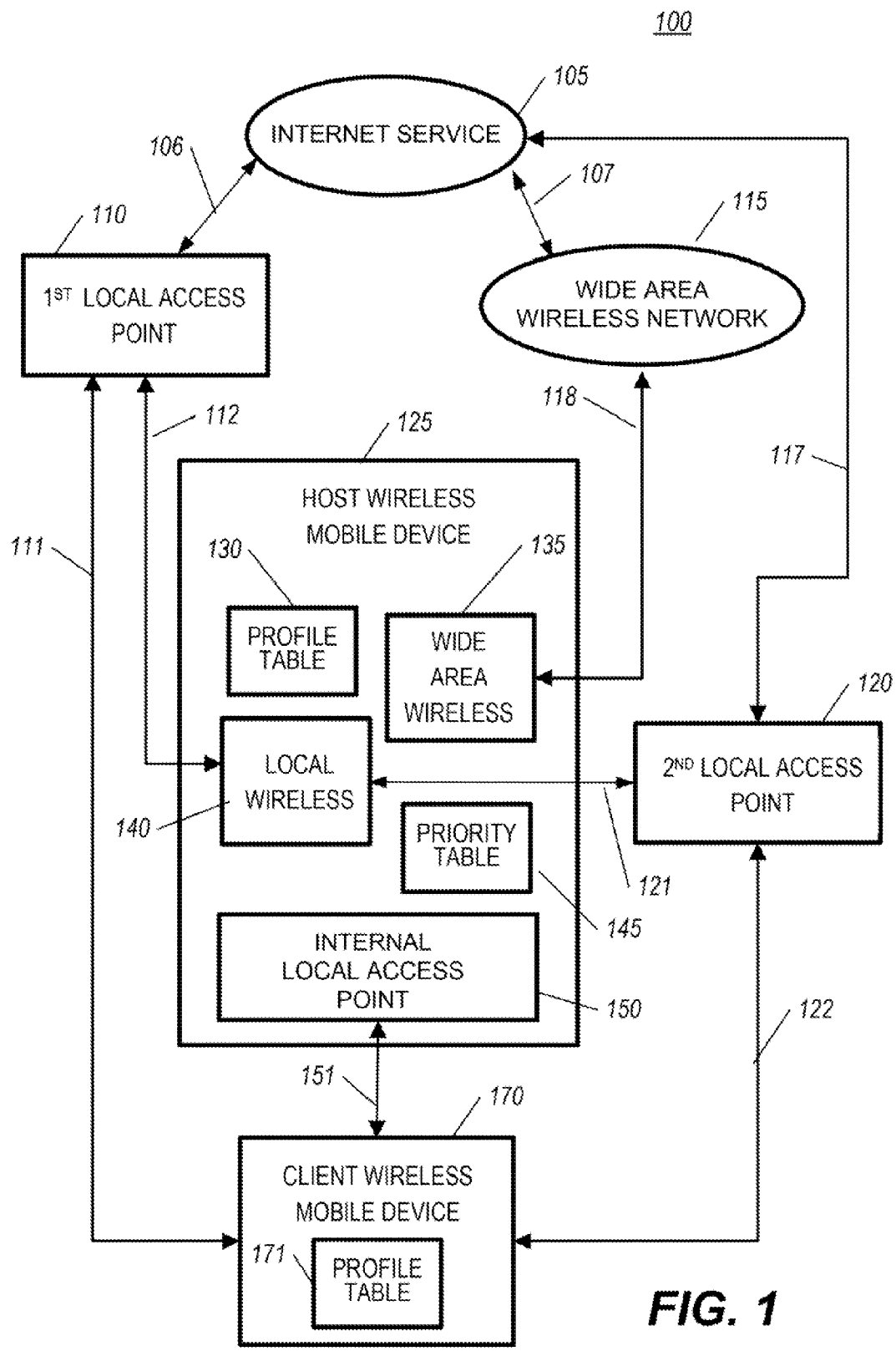
FIG. 1 shows a communication system environment that includes a host wireless mobile device, in accordance with certain embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail the following embodiments, it should be observed that the embodiments reside primarily in combinations of method steps and apparatus components related to wireless mobile communication devices that provide an internal local access point that provides internet services to another wireless communication device. More particularly, the described embodiments provide for automating the use of the internal local access point of a wireless mobile communication device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1, a communication system environment 100 is shown, in accordance with certain embodiments. The communication system environment 100 comprises an internet service 105, a first local access point 110, a wide area wireless network 115, a second access point 120, a host wireless communication device 125, and a client wireless communication device 170. The wireless communication devices 125, 170 are also referred to herein as wireless mobile devices (WMDs). The host WMD 125 may be a modified version of mobile wireless device types that exist today, such as cellular telephones and other small wireless communication devices such as trunked mobile phones (such as mobile devices compliant with the [Association of Public-Safety Communications Officials-International] APCO-16 standard). Larger wireless mobile communication devices such as tablets or even PC's operating as host WMD 125 may provide some benefits that smaller devices provide. The client WMD 170 may be a PC or a tablet that has local wireless connection capability, such as WiFi capability. Other WMDs, of which but one example is a gaming interface device, could benefit from the embodiments described herein. The internet service 105 may be the public World Wide Web, or could alternatively be another internet service, such as an enterprise internet service. The first and second local access points 110, 120 are access points that provide local wireless internet services, such as WiFi access points. A local access point is hereafter termed simply LAP. Alternative local area networks could be used in the communications environment 100, such as those for the Canopy™ system, originally designed by Motorola, Inc. of Schaumburg, Ill., and now distributed by Cambium™ Networks of Rolling Meadows, Ill. The wide area wireless network 115 may be a wide area wireless network such as a cellular network, or may be of another type, such as an IDEN® radio network, sold by Motorola Solutions, Inc. The host WMD 125 comprises the following functions: a profile table 130, a wide area wireless function 135, a local wireless function 140, a priority table 145, and an internal LAP function 150. The profile table 130 comprises access point names and associated pass phrases (when a pass phrase is used), which items have equivalents in other types of local area network systems but perhaps called by different names. The profile table 130 may also be referred to as a profile list 130. For example, the access point in a WiFI system is commonly called the SSID, as noted above. The local access point name may be one of more than one that are supported by one physical device. In the context of this document, local access point refers to the unique name of a local wireless service that is provided by a physical device. The pass phrase is used for security purposes such as encrypting data passing in either direction through the connection 112. The local wireless function 140 of the host WMD 125 operates to connect the host WMD 125 to the first LAP 110 when certain conditions are met. For example, the signal strength of the first LAP 110 may have the strongest signal strength of the signal of any LAP that is identified in the profile table 130. The local wireless function 140 may then establish a connection 112 with the first LAP 110 and obtain a first wireless internet service from the first LAP 110 via the wireless connection 112 between the host WMD 125 and the first LAP 110 and a connection (also known as an internet link) 106 between the first LAP 110 and the internet service 105.

The first LAP 110 may also provide other services to the host WMD 125, such as connection to other devices (not shown in FIG. 1) that are a part of a local area network of which the first LAP 110 is also a part. It will be appreciated that connection 112 to the local wireless service provided by LAP 110 requires that the host WMD 125 use an identity of the first local access point 110 to authorize the connection. This identity may include both the name and the pass phrase (if used). Such identities may be stored in a profile table 130 accessed by the local wireless function 140. Local area network systems other than WiFi have similar requirements. After the connection 112 is established with the first LAP 110, the local wireless function 140 may monitor service quality information about the first wireless internet service on a regular basis, including a connection status of the connection 112 (i.e., connected or disconnected), a radio signal strength indication (RSSI) of the connection 112, and a link status of the internet link 106 that provides internet service to the first LAP 110. In other systems other parameters that relate to the quality of the connections may be monitored. For example a signal to noise ratio could be used instead of RSSI. The monitoring may further include monitoring the same service quality information for other local access points to which the host WMD 125 is not presently connected but which are within radio range. Such monitoring may be conducted on a periodic basis. The scanning may provide the above mentioned service quality information as well as an identities of the first wireless internet services provided by the local access points that are within radio range, including the first wireless internet service of the first access point 110.

It will be appreciated that the client WMD 170 may have established the wireless internet service with the first LAP 110 either previously to or subsequent to the host WMD 125 having established the first wireless internet service with the first LAP 110, and that a user may be physically moving the host WMD 125 (e.g., a cellular telephone) and the client WMD 170 (e.g., a tablet) such that they are moving in somewhat the same manner with reference to a position of the first LAP 110. For example, the first mobile device 125 may be in a pocket of the user and the client WMD 170 may be in the hands of the user who is using the client WMD 170 to do work, but has started moving away from the first LAP 110. The client WMD 170 in this example has no wide area wireless function.

The priority table 145 of the host WMD 125 comprises identities of local access points that have been approved for automatic control by the WMD 125 of the internal LAP function 150. The unique feature of automatic control of the internal LAP function 150, by which is meant the activation of the internal LAP 150 without a human input to the WMD 125. By having a WMD 125 that includes automatic control of the internal LAP function 150, the user of the WMD 125 does not have to manually activate the internal LAP function 150 in order to achieve seamless or near seamless wireless internet connection of other wireless devices in the possession of the user that are obtaining wireless internet service from local access point 150 when the user moves away from the local access point 150. The priority table 145 may also be referred to as a priority list 145. The internal LAP function 150 is similar to functions commonly called Soft Access Point or Mobile Hotspot. The identities of the approved local access points may consist of only the names of the approved local access points, or the identities may comprise the name and an associated security phrase of each of the approved local access points. The identities of the approved local access points are also referred to as approved identities. The name alone may be used for the identity in at least two instances. In a first instance, a local access point does not use a pass phrase. This may be the case for homes, particularly those which are separated from other occupied strictures. In a second instance, the priority table includes only names of approved local access points; the associated pass phrase is obtained when needed from the profile table 130.

In some embodiments the values of the approved identities (i.e., the name and, if included in the identity in the priority table 145, the pass phrase) are entered manually by a user of the host WMD 125. In some embodiments, identities for the priority table 145 are determined automatically. For example, a total duration of connections made to local access points may be obtained using information from the local wireless function 140 and those local access points having the longest total durations may be automatically identified as approved local access points, Other algorithms could be used that include a count of the number of connections made to local access points and identify the most often connected local access points as being approved for inclusion in the priority table 145. In some embodiments, the user may identify an access point in the profile table 130 to be included in the priority table 145 when the profile is created, in response to a query at the time of creation, or by specific user action after the creation of the profile. In some embodiments, the identities may be determined and entered by a third party (e.g., for enterprise owned WMDs in which only enterprise local access points are included). In many embodiments the pass phrase is stored in protected form, for security purposes. The pass phrase may be stored only in the profile table 130 or in both tables 130, 145. For example, the profile table 130 may be a file this is protected from read or write access by any user other than the creator and a root user. In some embodiments, the pass phrases may be encrypted. In embodiments in which the instruction code for the automatic control of the internal LAP function 150 is constructed as separate code from the local wireless function 140, a separate priority table 145 may be used that stores only the names of approved local access points. In some embodiments, the physical profile table 130 and priority table 145 may be stored as one data base, which may then be named the profile table.

After the host WMD 125 obtains the first wireless internet service from the LAP 110, a determination is made as to whether the LAP 110 is approved for the host WMD 125 to perform automatic control of the internal LAP function 150, by reference to the priority table 145. When the LAP 110 is so approved, the host WMD 125 begins the process of automatic control of the internal LAP function 150 by monitoring the service quality information about the first wireless internet service to determine whether the service quality becomes unacceptable. As noted above, the service quality information may include a connection status of the connection 112 (i.e., connected or disconnected), a radio signal strength indication (RSSI) of the connection 112, and a link status of the internet link 106 that provides internet service to the first LAP 110. The determination of acceptability of the service quality may be made using one or more of these characteristics. In some embodiments, an unacceptable service quality is determined when both the RSSI has been below a threshold for a defined number of monitoring scans and the connection 112 is disconnected. Some embodiments may use duration instead of a count of scans. Some embodiments may use an RSSI threshold and a delay time to make the determination of unacceptability. Other embodiments may use several delay times, each associated with one of a plurality of RSSI thresholds to determine unacceptable quality when the delay time has elapsed after a disconnection of connection 112. For example, a longer delay time could be associated with a higher RSSI threshold. Additionally, a determination of unacceptable service quality may be made when the monitoring determines that the internet link 106 has been lost. A delay time may be associated with the link loss determination.

When a determination has been made that the service quality of the first wireless internet service has become unacceptable, the host WMD 125 completes the process of automatically controlling the enablement of the internal LAP function 150 by causing the internal LAP function 150 to activate an internal LAP service. The priority table 145 is used to determine the approved identity of a local access point for broadcasting for the internal LAP function 150. The approved identity is provided or obtained by the internal LAP function 150. The internal LAP function 150 is thus capable of providing a second wireless internet service to another wireless mobile device by using the wireless connection 118 to the wide area wireless network 115 from which the internet service that is used in the second wireless internet service is obtained. Because the identity of the internal LAP function 150 is determined from the priority table 145, the first and second wireless internet services do not necessarily have different identities; the priority table 145 and local conditions could result in the second wireless internet service having the same identity as the first wireless internet service, either on the same radio channel or a different local access point radio channel. In some embodiments, when the determination of unacceptable service quality is based upon the loss of the internet link 106, the second wireless internet service is caused to be activated with same identity as the first wireless internet service, but on an access point radio channel that is different than the radio channel of the first wireless internet service.

It will be appreciated, that when the second wireless internet service is activated and the client WMD 170 is moved away from the first LAP 110 in a similar manner to a movement of the host WMD 125, as is likely to happen when a user has possession of both devices, the client WMD 170 will disconnect from the first LAP 110 and connect to the internal LAP 150 of the host WMD 125 with connection 151 and obtain second wireless internet service by means of connections 151 and 118, thereby beneficially providing seamless or near seamless internet connection for the client WMD 170, automatically. In some cases, a plurality of client WMDs 170 may be connected to the first local access point 110, and the plurality of WMDs 170 may be then moved out of range of the local access point 110 at approximately the same time. This may happen, for example, when a family leaves their home together with several wireless mobile devices. In this case, each of the WMD's 170 will likely connect to the internal LAP 150 and maintain their internet connectivity with little or no interruption (i.e., achieve seamless or near seamless connectivity).

In some embodiments, the host WMD 125 and the client WMD 170 have a capability to only use one of the two functions 140, 150 (the local wireless function 140 and the internal LAP function 150) at a time. In certain of these embodiments, the host WMD 125 lacks access to or does not have an ability to use wireless access point scan information being obtained by the client WMD 170. In these embodiments when the client WMD 170 comes within radio range of another local access point 120 or the "original" LAP 110, the identity of the other local access point 120 or the "original" LAP 110 will likely be in the scan list of the client WMD 170 when the client WMD 170 has remained in close proximity to the host WMD 125. In some of these embodiments, the user may become aware of the physical nearness of the second local access point 120 to the user and manually deactivate the internal local access point 150, stopping the second wireless internet service with all client WMDs 170 and letting the local wireless function 140 of the host WMD 125 make a connection 121 to the second local access point 120 using a third wireless internet service. As a result, all client WMDs may make a new connection 122 to the second local access point 120, establishing third wireless internet services using connections 122. If the second local access point 120 is identified in the priority table 145 as being approved and has the highest priority, the host WMD 125 may then start monitoring the third wireless internet service for determining automatic control of the internal LAP function 150 (i.e., disconnection of the third wireless service) in the same as described herein above if and when the host and client WMDs are moved away from the second local access point 120. It will be appreciated that in these embodiments, the client user may first obtain wireless internet service when the client WMD 170 is used in the vicinity of the first LAP 110 (assuming it is approved), which for example may be in the user's home, and then maintain wireless internet service while not in the vicinity of any approved local access point by means of the user's host WMD 125, automatically.

In some embodiments, the host WMD 125 has a capability to use both of the two functions 140, 150 (the local wireless function 140 and the internal LAP function 150) simultaneously. In certain of these embodiments, the host WMD 125 lacks access to or does not have an ability to use wireless access point scan information being obtained by the client WMD. The capability to use both of the two functions 140, 150 simultaneously may be provided by designing the host WMD 125 with generally separated hardware and corresponding software capable of simultaneously handling both the local wireless function 140 and the internal LAP function 150. In these embodiments, when the user comes within radio range of one or more of other local access points or back into range of the "original" local access point 110, the host WMD 125 can communicate with the other (or the original) local access points, such as LAP 120, for purposes of (in this example) establishing a third wireless internet connection (using connection 121) with the second LAP 120, when the second LAP 120 is identified as a being approved for the host WMD 125 performing automatic control of the internal LAP function 150. If more than one approved local access point are within range of the host WMD 125, a LAP may be selected for connection by using the priority table 145. The priority table 145 may include parameters for the identities stored in the priority table 145 that influence the choice of which local access point to connect to when more than one access points are within radio range. The choice of which local access point to connect to may also be influenced by the RSSI values of the radio signals of the one or more local access points. The host WMD 125 may then establish the third wireless internet service with the selected local access point, which in this example is local access point 120, using the local wireless function 140. The host WMD 125 may then automatically disable the internal LAP function 150, thereby disconnecting the second wireless internet service connection 151 with all client WMDs 170 and thereby automatically causing the client WMDs 170 to seek and connect to a local access point as determined using a profile table 171 that is internal to the client WMDs 170.

Under the circumstances, it is likely that the client WMDs 170 will obtain third wireless internet service from local access point 120. It will be therefore be appreciated that in these embodiments, a client WMD 170 that remains in proximity to a host WMD 125 while both are being moved around may initially obtain wireless internet service when the client WMD 170 is used in the vicinity of the first LAP 110, which for example may be in the user's home. Then the client WMD 170 can maintain wireless internet service while not in the vicinity of any fixed local access point, using the connection 151 to the internal local access point 150 of the host WMD 125. The WMD 170 may continue to maintain wireless internet service without use of the host WMD 125 when the client WMD 170 comes within the vicinity again of the first LAP 110 or within the vicinity of a second approved LAP (such as the user's office) all without specific action on part of the user of the host and client WMD's 125, 170.

In certain embodiments, the host WMD 125 may have a capability to monitor a local access point scan function of one or more of the client WMDs 170 and additionally may be able to update the profile table 171 of the client WMDs 170. In certain of these embodiments, when the host WMD 125 finds that a second local access point 120 has appeared in the scan list of the client WMD 170 that is in the priority table 145 of the host WMD 125, the host WMD 125 can end the second wireless internet service with the client WMD 170. The host WMD 125 in these certain embodiments may maintain the second wireless internet service with other client WMDs 170 until each of the remaining client WMDs 170 have had the second local access point 120 show up in their scan list and have had their second wireless internet service terminated by the host WMD 125. At this time the local wireless function 140 of the host WMD 125 may be deactivated, allowing the host WMD 125 to make the connection 121 to the second local access point 120, thereby also obtaining the third wireless internet service. In certain embodiments in which the host WMD 125 is capable of adding an identity to a client WMD 170, the host WMD 125 may update the profile tables 171 of certain client WMDs 170 or all client WMDs 170 which are presently connected to the host WMD 125. The updates may be communicated using connections 151 after the host WMD 125 determines that the signal from the second local access point 120 is acceptable, and the identity of the second local access point 120 is in the priority table 145. In some embodiments, the host WMD 125 updates profile tables 171 of those client WMDs 170 that do not have the identity of the second local access point in their profile tables 171. By doing this the migration of at least some of the client WMDs 170 to the second local access point 120 may be sped up. The operation in these embodiments that have the capability to monitor a local access point scan function of one or more of the client WMDs 170 may be irrespective of whether or not the host WMD 125 has the capability to simultaneously use both the local wireless function 140 and the internal local access point 150.

Figure 2:
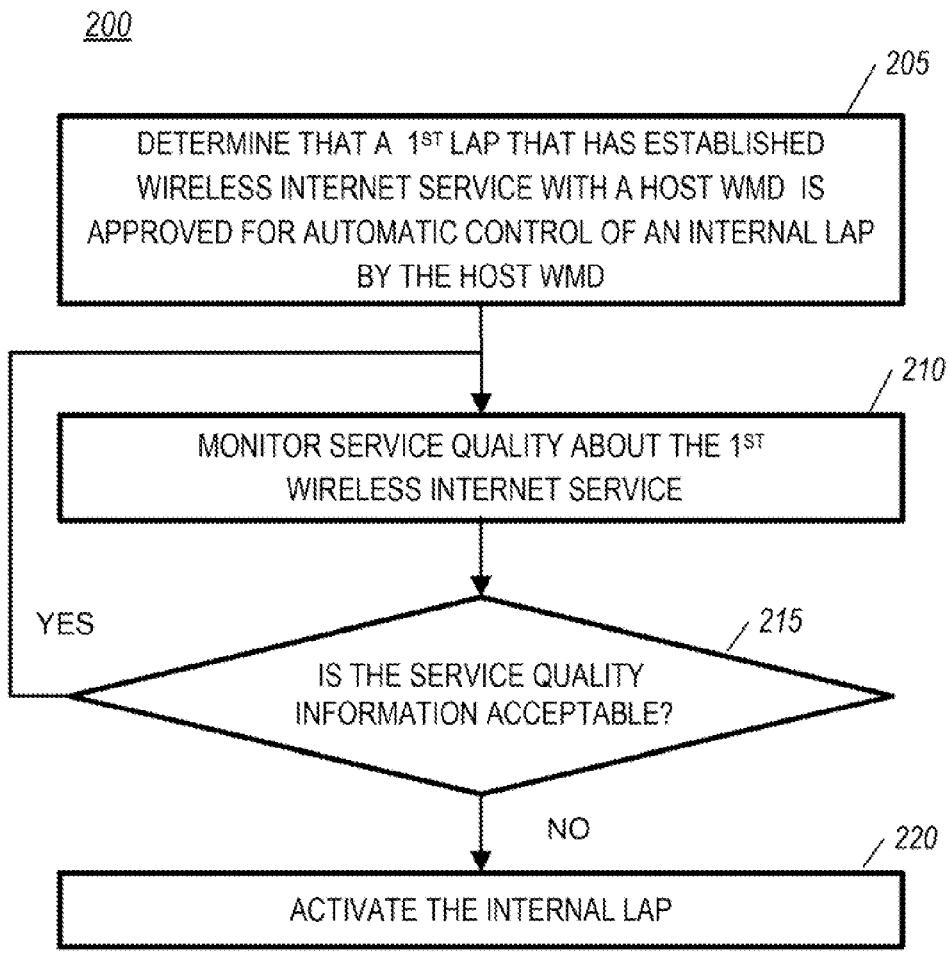

Referring to FIG. 2, a flow chart 200 shows some steps of a method used in a host wireless mobile device, in accordance with certain embodiments and the above descriptions. At step 205, a determination is made as to whether a first wireless internet service which has been established with a first local access point by the host wireless mobile device is approved for automatic control of an internal local access point function of the host wireless mobile device. At step 210, service quality information about the first wireless service is monitored. At step 215, a determination is made as to whether the service quality is acceptable. When the service quality is acceptable, the method continues to monitor the service quality at step 210. When the service quality is unacceptable the internal local access point function is activated. The internal local access point function is capable of providing a client wireless internet service to another wireless mobile device by using a wireless connection to a wide area wireless network from which internet service is obtained. The first and second wireless internet services do not necessarily have different identities.

Figure 3:
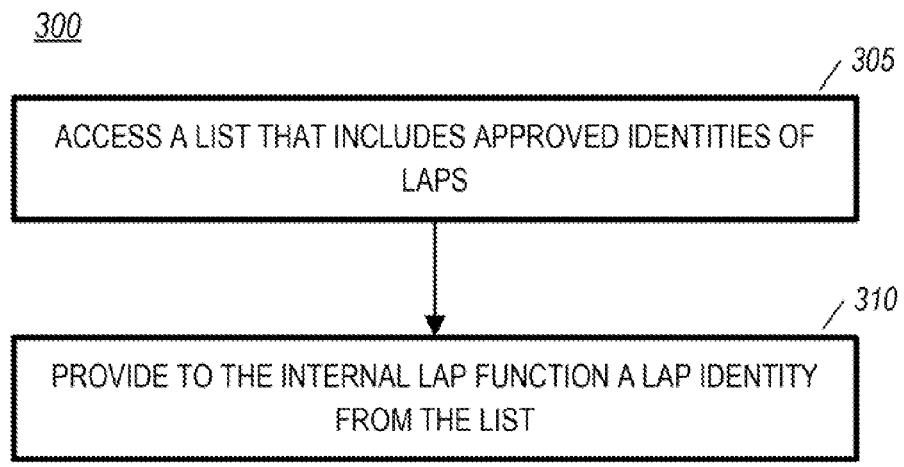

Referring to FIG. 3, a flow chart 300 shows details of steps of a method used in a host wireless mobile device, in accordance with certain embodiments and the above descriptions. The step 205 (FIG. 2) of determining that the first local access point is approved comprises the step 305 of accessing a priority list that includes identities of local access points that have been approved for automatic control of the internal access point function. At step 310, the step 220 (FIG. 2) of activating the internal local access point comprises providing to the internal local access point function an approved identity from the priority list that includes identities of local access points that have been approved for automatic control of the internal access point function. These identities are referred to as approved identities. In some embodiments, the identity of the local access point provided in step 310 comprises a name and may further comprise a security pass phrase that can be used to establish the second wireless internet service. In some embodiments, at least one local access point approved identity has been obtained by user input. For example, the host WMD 125 may have an applet that the user my open to manually enter the identity of a local access point that the user wants to be an approved local access point, or the host WMD 125 may have a function that asks the user if the user wants a new entry in the profile table 130 to also be an approved local access point. In some embodiments, at least one local access point approved identity has been obtained using protected data stored within the host wireless mobile device. In some embodiments, the service quality information comprises at least one of connection status of the first wireless internet service, radio signal strength indication (RSSI) of the first wireless internet service, and a link status of an internet link that provides internet service to the first local access point.

Referring to FIG. 4, a flow chart 400 shows details of a step of the method described with reference to step 220 (FIG. 2), in accordance with certain embodiments. At step 405 the step of activating 220 (FIG. 2) the internal local access point function further comprises determining a radio channel of the first wireless internet service and activating 220 (FIG. 2) the internal local access point function using a local access point identity for the first wireless internet service and a radio channel that is different than the radio channel of the first wireless internet service. This step is typically used only when the service quality is determined to be unacceptable due to a loss of the internet link 106.

Referring to FIG. 5, a flow chart 500 shows additional steps that may be used in the method described above with reference to FIG. 2, in accordance with certain embodiments. At step 505 the second wireless internet service is provided to one or more client wireless mobile devices. At step 510 an identity of a second local access point is determined that is available to the host wireless mobile device. In some embodiments, this determination may be made manually by the user. In some embodiments, this determination may be made by a host WMD that can simultaneously run the local wireless function and the internal local access function. In some embodiments, this determination may be made by a host WMD that can acquire information that is in the client WMD scan list. A determination is made by the WMD 125 at step 515 from the identity and a list of approved identities that is stored in the host WMD as to whether the second local access point is approved for automatic control of the internal local access point function of the host wireless mobile device. When the second local access point is not approved at step 515, a determination is again made at step 510 of an identity of another second local access point that is available to the host wireless mobile device. When the second local access point is approved at step 515 the second wireless internet service is ended with one or more of the client WMDs at step 520.

Figure 6:
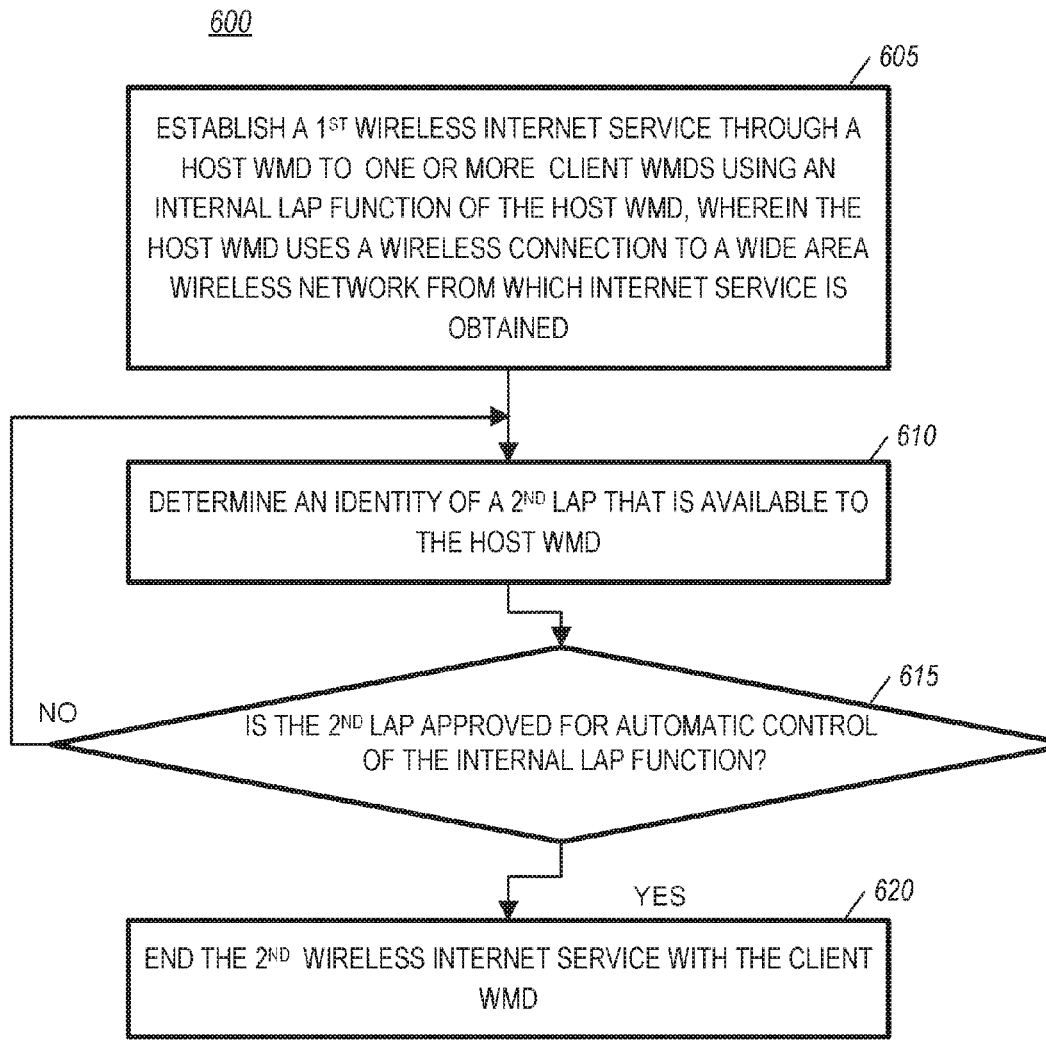
FIG. 6 shows some steps of a method used in the host wireless mobile device to automatically disable an internal wireless internet access point, in accordance with certain embodiments.

Referring to FIG. 6, a flow chart shows some steps of a method that is used in a wireless mobile device, in accordance with certain embodiments. At step 605, a first wireless internet service is established through the host wireless mobile device to one or more client wireless mobile devices using an internal local access point function of the host wireless mobile device, wherein the host wireless mobile device uses a wireless connection to a wide area wireless network from which the internet service for the wireless internet service is obtained. At step 610 an identity of a second local access point that is available to (within radio range of) the host wireless mobile device is determined by the host wireless mobile device. A determination is made at step 615 from the identity as to whether the second local access point is approved for the host wireless mobile device to perform automatic control of the internal local access point function of the host wireless mobile device.

In some embodiments, the identity of the second local access point is obtained by a local wireless function of the host wireless mobile device, which is functioning (running) simultaneously with an internal local access point. The internal local access point is simultaneously providing a second wireless internet service to the one or more client wireless mobile devices. The local wireless function obtains the identity of the second local access point from the second local access point. In some embodiments, the host wireless mobile device acquires identity information from one or more of the one or more client wireless mobile devices, such as from a scan list or scan function within the client wireless mobile device(s) that includes identities of local access points that the client wireless mobile device is able to communicate with. When the second local access point is not approved at step 615, a determination is again made at step 610 of an identity of another second local access point that is available to the host wireless mobile device. When the second local access point is approved at step 615 the first wireless internet service with one or more the clients is ended at step 620. These embodiments may be useful when the host WMD 125 determines that the second local access point is within range and is an approved access point while all of the one or more of the second WMDs are still using the first wireless internet service from the host WMD. When the identity of the second local access point is determined by the local wireless function of the host WMD (running simultaneously with the internal local access point of the WMD), the host WMD may disconnect wireless internet service with all client WMDs at approximately the same time. When the identity of the second local access point is determined by the host WMD acquiring the identity information from a scan list of a client device, the host WMD may disconnect only that client WMD and wait for other client WMDs to add the identity information about the second local access point to their scan list when they are within range of the second local access point.

Referring to FIG. 7, an electrical block diagram 700 of a wireless mobile device 705 is shown, in accordance with certain embodiments. The WMD 705 is capable of performing the functions described above with reference to FIGS. 1-6, though not necessarily within one embodiment of the WMD 705. Apparatus and functional aspects of the electronic device 705 may exist in the host WMD 125 described herein above with reference to FIG. 1. The electronic device 705 includes a processing section 710 comprising one or more processing devices, each of which may include such sub-functions as central processing units, cache memory, instruction decoders, just to name a few. The processing section 710 executes program instructions which may be located within memory within the processing devices, or may located in a memory 715 external to the processing section 710, to which the memory 715 is bi-directionally coupled, or in a combination of both. The program instructions that are executed include instructions for performing the method steps described with reference to method steps for certain embodiments shown in FIGS. 2-6. The processing section 710 is further coupled to a wide area wireless network receive-transmit function performed by a transceiver 720 that is coupled to a radio antenna 721. The wide area wireless network transceiver 720 in some embodiments is a cellular receiver-transmitter. The radio antenna 721 is internal to the electronic device 705 in many embodiments, but may be external to the electronic device 705 in some embodiments. The processing section 710 is further coupled to at least one local area wireless network receive-transmit function provided by transceiver 725 that is coupled to a radio antenna 726. The radio antenna 726 is internal to the electronic device 705 in many embodiments, but in some embodiments may be external to the electronic device 705. The local area wireless network transceiver 725 in some embodiments is a WiFi receiver-transmitter. In some embodiments, there may be a second local area wireless network transceiver function (not shown in FIG. 7), which may be also coupled to radio antenna 726. In embodiments having two local area wireless network transceiver function 725 they may both be WiFi receiver-transmitters. A client WMD 740 represents client WMD 170 in the descriptions of FIGS. 1-6, and is connected at times to the electronic device 705 via a radio signal 741. In some embodiments the wide area network transceiver 720 and the local area network transceiver 725 may each comprise one or more processors and memory, and may also comprise circuits that are unique to radio protocols defined by an industry standard, and may referred to as a wide area transceiver. The electronic device 705 comprises several sets of executable operating instruction 751, 752, 753, 754. Executable operating instruction set 751 comprises operating instructions for some embodiments of the wide area wireless function 135 described herein above. Executable operating instruction set 752 comprises operating instructions for some embodiments of the local wireless function 140 described herein above. Executable operating instruction group 753 comprises operating instructions for some embodiments of the internal local access point function 150 described herein above. Executable operating instruction group 754 comprises operating instructions for function of certain embodiments related to automatic control of the internal local access point function 150 described herein above. The apparatus block diagram 700 shows the executable operating instructions (EOI) 751, 752, 753, 754 as being stored in the memory 715 external to the processing section 710. The memory 715 also stores data in priority table 760 and in profile table 761 as described herein above with reference to priority table 145 and profile tables 130, 171, which may be combined as one table, or list. The memory 715 of the electronic device 705 also includes sets of instructions identified as an operating system (OS) and other applications and functions not explicitly shown in FIG. 7. The combination of the processing section 710, the EOIs 751, 752, 753, 754, the data, the OS, and the other applications and functions is also referred to as the processing system of the electronic device 705. The processing section 710 may be coupled to user input/output components, or user interface (UI) 735, through input/output interface circuitry (I/O) 730 that is controlled by the processing section 710. The I/O 730 in some embodiments may be included in the processing section 710. The I/O 735 provides for communications to hardware elements (the UI 735) of the electronic device, such as keys, displays, and batteries, and to wired I/O such as that which uses standard hardware and software protocols (e.g., Universal Serial Bus, 1394, or Ethernet). In some embodiments, the executable operating instructions 752 and 753 operate with one local area wireless network transceiver function 725, and only one function can be running at a time. In other embodiments, the one local area wireless network transceiver function 725 may be able to support both of the executable operating instructions 752 and 753 operating simultaneously (for example, the local area wireless network transceiver function 725 may have one front end [RF amplifier] and two back end portions), or there may be two local area wireless network transceiver functions 725 that support simultaneous operation of both executable operating instructions 752 and 753

It will be appreciated that embodiments of the invention described herein may be comprised of one or more conventional processors and unique stored program instructions that control the one or more processors to implement, in conjunction with certain non-processor circuits, some, most, or all of the functions of the embodiments of the invention described herein. The non-processor circuits may include, but are not limited to, a radio receiver, a radio transmitter, signal drivers, clock circuits, power source circuits, and user input devices. As such, these functions may be interpreted as steps of a method to perform automatic control of local access point that is internal to a wireless mobile device. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions have been described herein. In those situations for which functions of the embodiments of the invention can be implemented using a processor and stored program instructions, it will be appreciated that one means for implementing such functions is the media that stores the stored program instructions, be it magnetic storage or a signal conveying a file. Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method used in a host wireless mobile device, comprising:
   determining that a first local access point which has established a first wireless internet service with the host wireless mobile device is approved for the host wireless mobile device to perform automatic activation of an internal local access point function of the host wireless mobile device, wherein the internal local access point function is a mobile hotspot;
   monitoring service quality information about the first wireless internet service;
   determining from the service quality information that the service quality is unacceptable; and
   activating the internal local access point function when the service quality is determined to be unacceptable, wherein the internal local access point function is capable of providing a second wireless internet service to at least one of one or more other wireless mobile devices by using a wireless connection to a wide area wireless network from which internet service is obtained, and wherein the first and second wireless internet services do not necessarily have different identities,
   wherein determining that the first local access point is approved comprises accessing a list that includes identities of local access points that have been approved for automatic activation by the host wireless mobile device so as to provide seamless wireless internet service to the one of one or more other wireless mobile devices.

2. The method according to claim 1, wherein activating the internal local access point function comprises providing an approved identity from the list to the internal local access point function.

3. The method according to claim 2, wherein the approved identity comprises a name that can be used to establish the second wireless internet service.

4. The method according to claim 1, wherein at least one approved identity has been obtained by user input.

5. The method according to claim 4, wherein at least one approved identity has been obtained using protected data stored within the host wireless mobile device.

6. The method according to claim 1, wherein the service quality information comprises at least one of connection status of the first wireless internet service, radio signal strength indication (RSSI) of the first wireless internet service, and a link status of an internet link that provides internet service to the first local access point.

7. The method according to claim 1, further comprising determining a radio channel of the first wireless internet service, wherein activating the internal local access point function further comprises activating the internal local access point function to provide a second wireless internet service having an identity of the first wireless internet service with a radio channel that is different than the radio channel of the first wireless internet service.

8. The method according to claim 1, comprising:
providing the second wireless internet service to one or more client wireless mobile devices;
determining an identity of a second local access point that is available to the first wireless mobile device;
determining from the identity that the second local access point is approved; and
ending the second wireless internet service with one or more of the one or more client wireless mobile devices.

9. The method according to claim 1, comprising:
providing the second wireless internet service to one or more client wireless mobile devices;
determining from one of the one or more client mobile devices an identity of a second local access point that is available to the one of the one or more client wireless mobile devices;
determining from the identity that the second local access point is approved for the host wireless mobile device to perform automatic control of the internal local access point function of the host wireless mobile device; and
ending the second wireless internet service with the one of the one or more client wireless mobile devices.

10. A method used in a host wireless mobile device, comprising:
establishing a first wireless internet service through the host wireless mobile device to one or more client wireless mobile devices using an internal local access point function of the host wireless mobile device, wherein the internal local access point function is a mobile hotspot, and wherein the host wireless mobile device uses a wireless connection to a wide area wireless network from which the internet service is obtained;
determining an identity of a second local access point that is available to the host wireless mobile device;
determining that the second local access point is approved for the host wireless mobile device to perform automatic control of the internal local access point function of the host wireless mobile device by reference to a list of approved local access point identities stored in the host WMD, the list including identities of local access points that have been approved for automatic activation by the host wireless mobile device so as to provide seamless wireless internet service to at least one of the one or more client wireless mobile devices; and
ending the first wireless internet service with the at least one of the one or more client wireless mobile devices.

11. The method according to claim 10 wherein the step of determining an identity is performed by the host wireless mobile device simultaneously using a local wireless function to scan for wireless local access points and providing wireless internet service to one or more clients using an internal local access point function.

12. The method according to claim 10 wherein the step of determining an identity is performed by the host wireless mobile device acquiring from the client wireless mobile device identity information of a local access point to which a client wireless mobile device has made connection.

13. The method according to claim 10, further comprising downloading the identity of the second local access point to another client wireless mobile device.

14. A host wireless mobile device, comprising:
a processing function; and
a memory that includes program instructions that are executed by the processing function to
determine that a first local access point which has established a first wireless internet service with the host wireless mobile device is approved for the host wireless mobile device to perform automatic activation of an internal local access point function of the host wireless mobile device, wherein the internal local access point function is a mobile hotspot;
monitor service quality information about the first wireless internet service;
determine from the service quality information that the service quality is unacceptable; and
activate the internal local access point function when the service quality is determined to be unacceptable, wherein the internal local access point function is capable of providing a second wireless internet service to at least one of one or more wireless mobile devices by using a wireless connection to a wide area wireless network from which internet service is obtained, and wherein the first and second wireless internet services do not necessarily have different identities,
wherein determining that the first local access point is approved comprises accessing a list that includes identities of local access points that have been approved for automatic activation by the host wireless mobile device so as to provide seamless wireless internet service to the one of one or more other wireless mobile devices.

15. A host wireless mobile device, comprising:
a processing function; and
a memory that includes program instructions that are executed by the processing function to
establish a first wireless internet service through the host wireless mobile device to one or more client wireless mobile devices using an internal local access point function of the host wireless mobile device, wherein the internal local access point function is a mobile hotspot, and wherein the host wireless mobile device uses a wireless connection to a wide area wireless network from which the internet service is obtained;
determine an identity of a second local access point that is available to the host wireless mobile device;

determine that the second local access point is approved for the host wireless mobile device to perform automatic control of the internal local access point function of the host wireless mobile device by reference to a list of approved local access point identities stored in the host WMD, the list including identities of local access points that have been approved for automatic activation by the host wireless mobile device so as to provide seamless wireless internet service to at least one of the one or more client wireless mobile devices; and end the first wireless internet service with the at least one of the one or more client wireless mobile devices.

\* \* \* \* \*